United States Patent [19]

Tanaka et al.

[11] Patent Number: 4,985,882
[45] Date of Patent: Jan. 15, 1991

[54] TRACK ACCESS CONTROL SYSTEM FOR DISK SYSTEM, HAVING ECCENTRICITY CORRECTION MEANS

[75] Inventors: Shigeyoshi Tanaka; Shigenori Yanagi, both of Kawasaki, Japan

[73] Assignee: Fujitsu Limited, Kawasaki, Japan

[21] Appl. No.: 299,018

[22] Filed: Jan. 19, 1989

[30] Foreign Application Priority Data

Jan. 19, 1988 [JP] Japan ................................ 63-008799
Jan. 22, 1988 [JP] Japan ................................ 63-012315

[51] Int. Cl.$^5$ ............................................. G11B 7/00
[52] U.S. Cl. .............................. 369/44.32; 369/44.34; 360/77.04
[58] Field of Search ............... 369/44.14, 44.32, 44.27, 369/44.34, 32; 360/77.01, 77.02, 77.04; 358/342

[56] References Cited

U.S. PATENT DOCUMENTS 4,476,555 10/1984 Joicki et al. ....................... 369/44.32
4,527,263 7/1985 Nakagawa ......................... 369/44.32
4,775,966 10/1988 Miura et al. ....................... 369/44.32
4,907,214 3/1990 Nagano et al. ......................... 369/49

OTHER PUBLICATIONS

Nikkei Mechanical 1987.7.13, pp. 66-79.

Primary Examiner—Robert L. Richardson
Attorney, Agent, or Firm—Staas & Halsey

[57] ABSTRACT

A track access control system for a disk storage system having an eccentricity correction unit. The eccentricity correction unit includes an eccentricity detecting unit, an eccentricity data storage unit and an eccentricity compensation unit. The eccentricity data storage unit includes a memory, an address generating circuit, a filter and a comparator. The comparator and the filter function as delta modulation means to provide digital eccentricity data to be stored in the memory. The filter also outputs analog eccentricity data to be used for compensation of the eccentricity.

27 Claims, 14 Drawing Sheets

Fig. 1 PRIOR ART
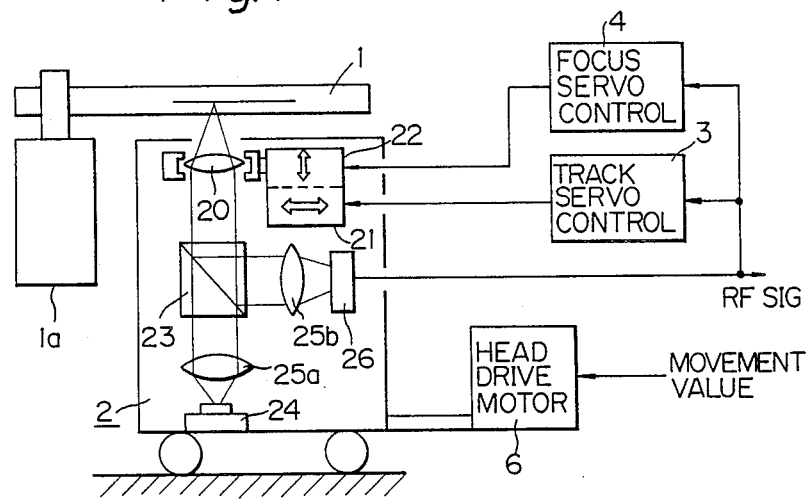
Fig. 2a
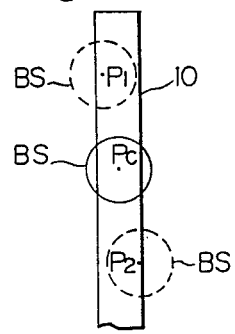
Fig. 2b
Fig. 3a  Fig. 3b  Fig. 3c
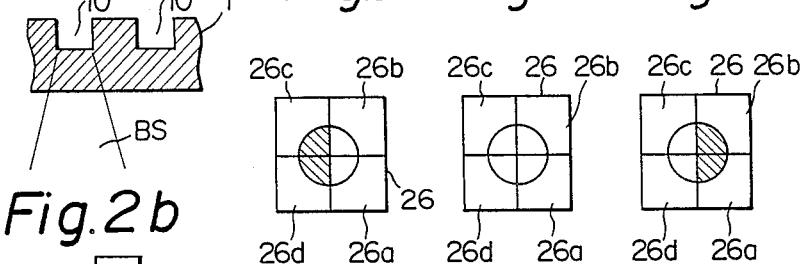
Fig. 4
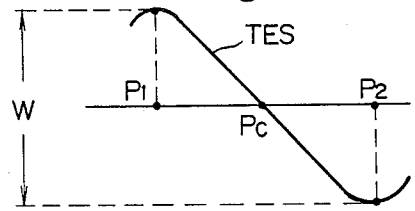

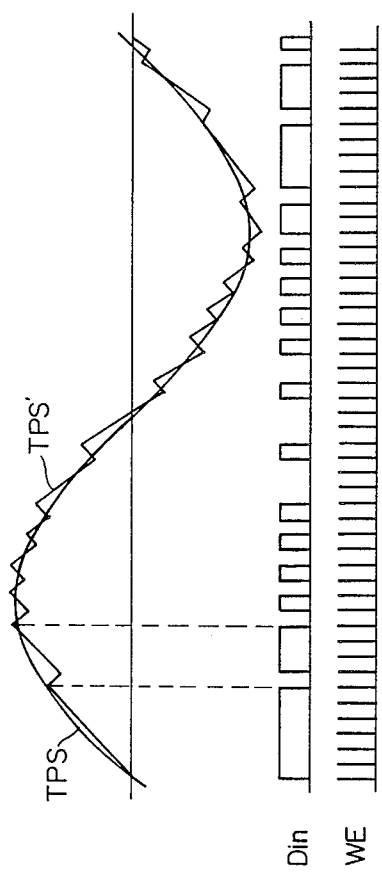

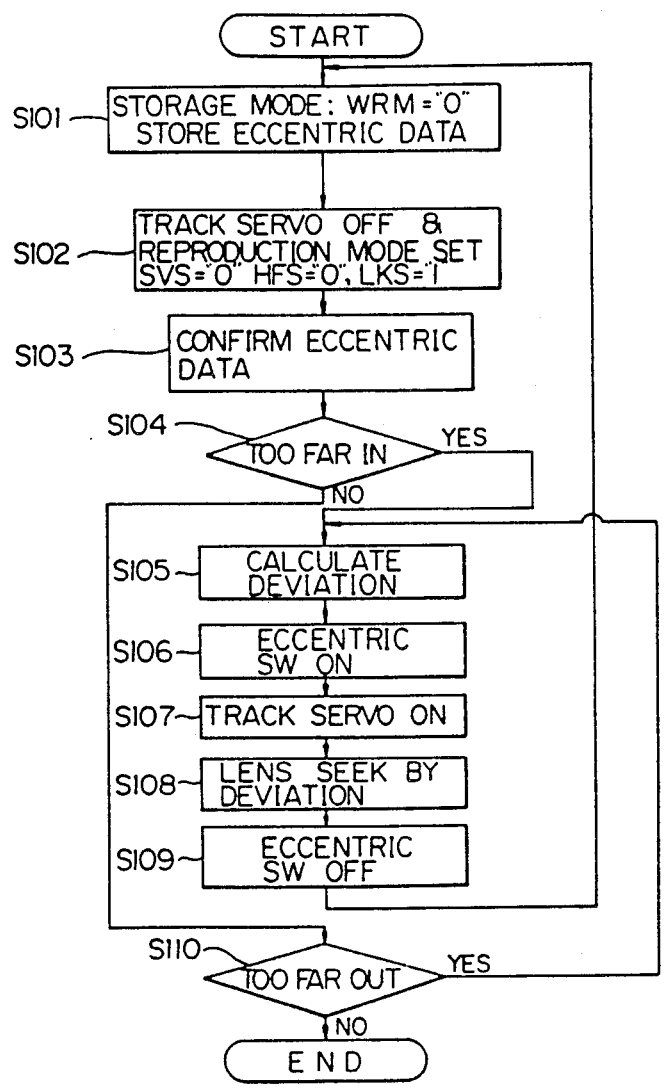

TRACK ACCESS CONTROL SYSTEM FOR DISK SYSTEM, HAVING ECCENTRICITY CORRECTION MEANS

BACKGROUND OF THE INVENTION

1. Field of the Invention

The present invention relates to a track access control system for use in a disk system, for example, an optical disk system, or a magnetic disk system, to enable the light beam from a head to follow a disk track. More particularly, it relates to a track access control system having an eccentricity (or offset) correction means which can be formed by a circuit of simple construction.

2. Description of the Related Art

Recently, optical disk units have attracted public attention as useful as a large capacity memory unit, since the track pitch can be made a few microns, and because a light beam can be used to read and write data from and to the optical disk.

This optical disk unit employs a track servo controller for enabling a light beam (light spot) to follow an optical disk track.

In this track servo control system, diffraction by a pre-groove in an optical disk, used as a recording medium, is utilized to generate a track error signal based on which servo control is utilized to enable a light spot to follow a track (guide groove) in the optical disk.

Because non-contact recording/reproduction can be carried out, the optical disk used in many optical disk units is a replaceable type, however a replaceable optical disk is frequently decentered or offcentered and a long time is required for a pull-in of the track servo. Accordingly, eccentricity correction control has been adopted (Re: NIKKEI MECHANICAL 1987, 7, 13. PP. 73-74). The eccentricity correction control, as described hereinafter, however, has the defects of complex circuit construction and low accuracy.

SUMMARY OF THE INVENTION

An object of the present invention is to provide a track access control system having eccentricity correction control means formed by a circuit of simple construction.

Another object of the present invention is to provide a track access control system having eccentricity correction control means enabling precise correction of any eccentricity.

According to a first aspect of the present invention, there is provided a track access control system for use in a disk storage system including a rotatable recording disk on which a plurality of tracks, to which data is recorded and from which data is read, are formed along a rotation direction of the rotatable disk. A data recording and reading head which is movable in a radial direction across the disk is included along with track actuator means for moving the head in a radial direction of the disk. A track error sensor is used for detecting a track error signal in response to a signal read through the head. A track servo control unit, operatively connected to the track error sensor and the track actuator unit is used, for positioning the head at a desired position through the track actuator unit in response to the track error signal from the track error sensor; and an eccentricity correction unit, operatively connected to the track error sensor, and operatively connected to the track servo control unit to cooperate therewith is used, for detecting an eccentricity of the tracks in a first condition, storing the eccentricity, and compensating the eccentricity of the track together with the track servo control unit, in a second condition after the first condition.

The eccentricity correction unit includes an eccentricity detecting unit for detecting the eccentricity in response to a deviation of the track for at least a half rotation of the disk and an eccentricity wave signal storage unit having a memory. The unit also includes an address generation circuit, a filter connected to an output of the memory, and a comparator having an input connected to an output of the filter, another input thereat connected to the eccentricity detecting unit to receive the eccentricity data, and an output thereof connected to an input of the memory. The address generation circuit generates an address signal for the memory in response to the rotation of the disk. The filter reproduces an analog reproduction eccentricity wave signal in response to data stored in the memory. The comparator compares the analog reproduction eccentricity wave signal with the received eccentricity and outputs digital data indicating a polygonal line shaped sinusoidal eccentricity signal.

The track access control system also includes an eccentricity compensation unit for receiving the analog reproduction eccentricity wave signal from the filter and adding the received reproduction eccentricity wave signal to the track error signal so that the eccentricity is compensated.

The memory comprises a random access memory into which the eccentricity data is stored during only the first condition and from which the eccentricity data is read during only the second condition.

The address generation circuit includes a counter unit receiving the rotation signal and generating the address for the memory in response to the rotation signal.

The rotation signal is a clock signal generated by a clock generator, and is used for driving the rotatable recording disk.

The filter includes a resistor and a capacitor. The resistor and the capacitor are connected to a form a first-order delay circuit.

The eccentricity correction unit further comprises a controllable eccentricity detecting unit for detecting controllable eccentricity data for at least a half rotation of the disk. The controllable eccentricity data falls in a follow range of the light beams throughout all tracks of the disk.

Preferably, the controllable eccentricity detecting unit detects an optimum controllable eccentricity data which falls in a center of the follow range.

The controllable eccentricity detecting unit includes a deviation detecting unit for detecting a deviation of the controllable eccentricity for at least a half rotation of the disk from the eccentricity data stored in the memory and a track skip unit, operatively connected to the deviation detecting unit, for skipping the head through the track actuator unit by the detected deviation. Also included is an eccentricity detecting and updating unit for detecting an eccentricity adjusted by the skip operation of the head, and updating the detected eccentricity data to the eccentricity wave signal storage unit in a polygonal line shaped sinusoidal eccentricity signal. The unit further includes an optimum eccentricity detection control unit for detecting an optimum eccentricity for at least a half rotation of the disk and controlling operations of the deviation detecting unit, the track skip unit and the eccentricity detecting and updating unit to sequentially continue the operations until the optimum eccentricity data is detected.

The detection of the eccentricity and/or the detection of the optimum eccentricity data are carried out in one full rotation of the disk.

The memory comprises a random access memory into which the eccentricity data and/or the minimum eccentricity data are stored during only the first condition, and from which the eccentricity data and/or the minimum eccentricity data are read during only the second condition.

The track actuator unit may include a first moving unit, and a second moving unit mounted on the first moving unit. The first moving unit moves the head more than one track, and the second moving unit finely moves the head at the track after completion of the movement of the first moving unit.

There is also provided a track access control system for use in a disk storage system including a rotatable recording disk on which a plurality of tracks, onto which data is recorded and from which data is read, are formed along a rotation direction of the rotatable disk, a data recording and reading head which is movable in a radial direction across the disk, a track actuator unit for moving the head in a radial direction of the disk, and a track error sensor for detecting a track error signal in response to a signal read through the head. The track access control system includes a track servo control unit, operatively connected to the track error sensor and the track actuator unit for positioning the head at a desired position through the track actuator unit in response to the track error signal from the track error sensor. Also included is an eccentricity correction unit, operatively connected to the track error sensor, and operatively connected to the track servo control unit to cooperate therewith, for detecting an eccentricity of the tracks at a first condition, storing the eccentricity, and compensating the eccentricity of the track together with the track servo control unit at a second condition after said first condition.

The eccentricity correction unit includes an eccentricity detecting unit for detecting said eccentricity data in response to a deviation of said track for at least a half rotation of said disk and an eccentricity wave signal storage unit having a memory. Also included is an address generation circuit, a filter connected to an output of the memory, and a comparator having an input connected to an output of said filter, another input thereat connected to the eccentricity detecting unit to receive said eccentricity data, and an output thereof connected to an input of said memory. The address generation circuit generates an address signal for the memory in response to the rotation of the disk, the filter reproduces an analog reproduction eccentricity wave signal in response to data stored in said memory, the comparator comparing the analog reproduction eccentricity wave signal with the received eccentricity and outputting digital data indicating a polygonal line shaped sinusoidal eccentricity signal. An eccentricity compensation unit is used for receiving the analog reproduction eccentricity wave signal from the filter and adding said received reproduction eccentricity wave signal to the track error signal, and a controllable eccentricity detecting unit is used for detecting controllable eccentricity data for at least a half rotation of the disk, the controllable eccentricity data falling in a follow range of the light beams throughout all tracks of the disk.

According to a second aspect of the present invention, there is also provided a signal storage system including: a memory; an address generation circuit; a filter connected to an output of the memory; and a comparator having an input connected to an output of the filter, another input receiving an analog input signal, and an output thereof connected to an input of the memory. The address generation circuit generates an address signal for the memory in response to a clock signal. The filter reproduces an analog reproduction signal in response to data stored in the memory. The comparator compares the analog reproduction signal with the analog input signal and outputs digital data to the memory.

The input analog signal may comprise a sinusoidal wave, and the filter reproduces the analog sinusoidal reproduction signal.

The filter includes a resistor and a capacitor. The resistor and the capacitor are connected to form a first-order delay circuit.

The memory comprises a random access memory into which the analog input signal is stored during only a first condition, and from which the data is read during only a second condition after the first condition.

The address generation circuit includes a counter unit receiving the clock signal and generating the address for the memory in response to the clock signal.

BRIEF DESCRIPTION OF THE DRAWINGS

Other objects and features of the present invention will be described in detail with reference to the accompanying drawings, in which:

FIG. 1 is a block diagram of a prior art track servo system for an optical disk;

FIGS. 2a and 2b are views illustrating focusing of a light beam in the track servo system shown in FIG. 1;

FIGS. 3a to 3c are views illustrating the detection by a four-division photodetector in FIG. 1;

FIG. 4 is a graph representing a track servo of the track servo system shown in FIG. 1;

FIGS. 14a to 14c are timing charts representing the operation of the eccentricity correction unit shown in FIG. 12;

FIG. 19 is a flow chart showing the operation of an adjustment of eccentricity data in the track access control system shown in FIG. 18.

DESCRIPTION OF THE PREFERRED EMBODIMENTS

Figure 5:
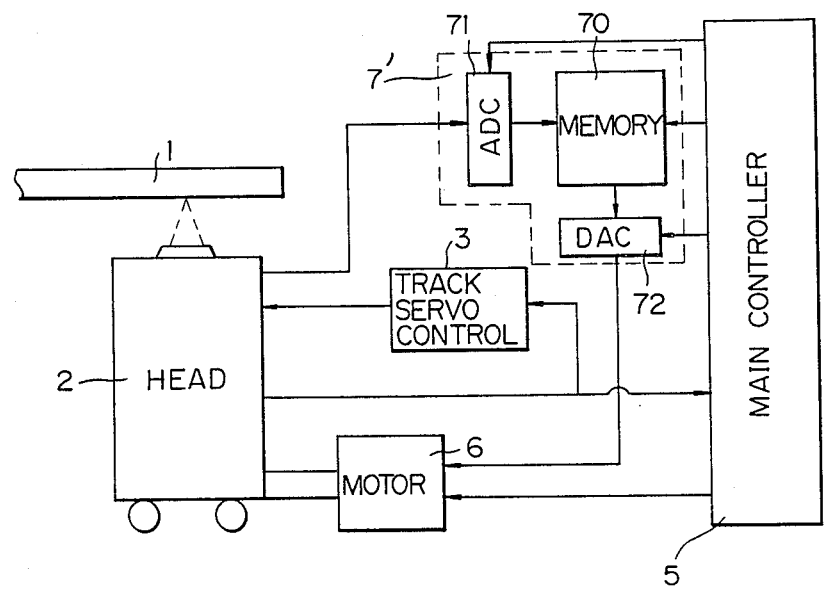
FIG. 5 is a block diagram of a prior art access control system having an eccentricity correction control unit.

Before describing the present invention, a prior art track access control system will be described.

FIG. 1 is an explanatory drawing of the track servo for an optical disk.

In the drawing, an optical head 2 is moved radially over an optical disk 1 and positioned by a head drive motor 6 in relation to the optical disk 1 rotated about pivot by a motor 1a, and reading (reproduction)/writing (recording) is carried out from and to the optical disk 1 by the optical head 2. The optical head 2 has a configuration such that light emitted from a semiconductor laser 24, as a light source, is guided through a lens 25a and a deflecting beam splitter 23 to an objective lens 20 which will modify the light beam to produce a beam spot (light spot) BS and project the spot onto the optical disk 1. The light reflected from the optical disk 1 passes through the lens 20 and is made incident upon a four division photodetector 26, consisting of four detecting sections 26a to 26d as shown in FIG. 3, by the deflecting beam splitter 23 and a lens 25b. Such an optical disk unit uses an optical disk 1 on which many tracks or pits are formed radially and are regularly spaced at a pitch of a few microns, and therefore, a slight decentering of the optical disk will cause a large displacement of the track from the beam spot, and a warp in the optical disk 1 will cause a focal dislocation of the beam spot. Accordingly, a beam spot of less than one micron must follow these positional variations. To this end, there are provided a focus actuator (focus coil) 22 which moves the objective lens 20 of the optical head 20 vertically in the plane of the drawing to change the focus position of the lens, and a track actuator (track coil) 21 which moves the objective lens 20 horizontally in the plane of the drawing to change the projecting direction in the direction of the track. Also, corresponding to the above-mentioned actuators 20 and 22, there are provided a focus servo controller 3 which generates a focus error signal FES from a photo-detection signal output from the photodetector 26 to drive the focus actuator 22, and a track servo controller 3 which generates a track error signal TES from the photo-detection signal output from the photodetector 26 to drive the track actuator 21.

As shown in FIG. 2a, the principle of the track servo control is to utilize the diffraction of the beam spot BS by the spiral guide groove (track) 10 previously formed in the optical disk 1. Namely, an error in position of the beam spot in relation to the track 10 is provided by utilizing the phenomenon that the distribution of the amount of light reflected on the photodetector 26 varies due to the light diffraction by the track 10 in accordance with the position of the beam spot BS in relation to the track 10. For example, where the push-pull method is adopted, which uses the fourdivision photodetector 26 consisting of the four photodetector sections 26a, 26b, 26c, and 26d, the distribution of the amount of light reflected on the photodetector 26 will be as shown in FIG. 3a, when the beam spot BS is in a position P1 in relation to the track 10 as shown in FIG. 2c; as shown in FIG. 3b when the beam spot is in a position $P_c$ in relation to the track 10; and as shown in FIG. 3c when the beam spot is in a position P2 in relation to the track 10.

Therefore, in the track servo controller 3, a track error signal TES as shown in FIG. 4 is provided by determining a value $((Sa+Sb)-(Sc+Sd))$ from outputs Sa to Sd of the photodetector sections 26a to 26d. Since the objective lens 20 is horizontally moved by the track actuator 21 driven in accordance with the track error signal TES, the beam spot can be controlled to follow the track 10 on the optical disk 1. The optical head 2 is moved by the motor 6 for a coarse access until the light beam approaches a target track (less than about 100 tracks from the target track), and then the track servo control is turned ON to realize a fine positioning of the light beam. Since the track servo control is OFF during the coarse access and is turned ON after completion of the coarse access, if the optical disk 1 is greatly decentered, the track crossing speed is high at the start of the track-servo pull-in and the time from the start to the end of the track-servo pull-in is long, and thus the access speed is low.

To solve these problems, a track access control technique adopting an eccentricity (offset) correction (for example, in the scientific magazine "Nikkei Mechanical", July 13, 1987, pp. 73 to 74) shown in FIG. 5 was proposed.

The prior art eccentricity correction will be briefly described. Immediately after turning ON a power supply, or immediately after an exchange of a disk, position deviations of tracks are measured by an optical head during a half rotation of the disk, and the measured results are approximated to sinusoidal waves and stored in a memory. The reason why the position deviations are approximated to sinusoidal waves is based upon the fact that the change of the track position with an elapse of time is approximately expressed as a sinusoidal wave. During an access operation, the position deviations are sequentially read from the memory in response to the rotation of the disk, converted into an analog value and added to a position command for a voice coil motor in a coarse access mechanism. To improve accuracy for following the position change of the track, the position of the light beam is detected by an optical one-dimensional position sensor, and the detected position is fed back to a control system of the coil motor. Since the data stored in the memory records only the position change for a half rotation of the disk, a phase change up to 180° C. with respect to an actual time change of the track may occur, first, the voice coil motor is operated by using the stored eccentricity correction data, and simultaneously servo information for the track is read by the optical detector and used for checking the eccentricity correction. When the eccentricity correction is not correct, the phase is advanced by 180°.

This prior art eccentricity correction control system uses waveform storage 7' in addition to the configuration shown in FIG. 1, and a positional variation of the track just after the power supply is turned ON or the optical disk is replaced is measured by the optical disk 2 and stored as a table in the waveform storage 7'. This eccentricity information is read from the waveform storage 7 during the access operation and added to the positional command to the motor 6, to drive the motor 6. This eccentricity correction control considerably reduces the time needed for the pull-in of the track servo, since the track servo control can be started after the light beam is moved to follow the eccentricity of the track until the track crossing speed is reduced to enable an accurate following movement.

In the conventional technique, however, since the output signal from the optical head 2 is an analogue waveform, (generally a sinusoidal wave), the waveform storage 7' must be provided with an A/D converter 71 for converting the analogue output into a digital signal, a memory 70 for storing the output from the A/D converter 71, and a D/A converter 72 for reproducing the eccentricity information in the memory 70 as an analogue waveform, and therefore, the controller 5 must be used each time for controlling the reading/writing from and to the memory.

Accordingly, the configuration of the waveform storage 7' is complicated, making the track access control system expensive and the control, per se, complicated.

Also since the eccentricity correction is controlled by the motor for the coarse access, an expensive, low-precision DC servo motor must be used as the motor 6, which makes the configuration of the optical head driver and the motor servo system complicated, and thus increases the manufacturing costs.

An object of the present invention is to provide a track access control system for use in a disk unit, which system is inexpensive and can control the track access by an eccentricity correction control.

Figure 6:
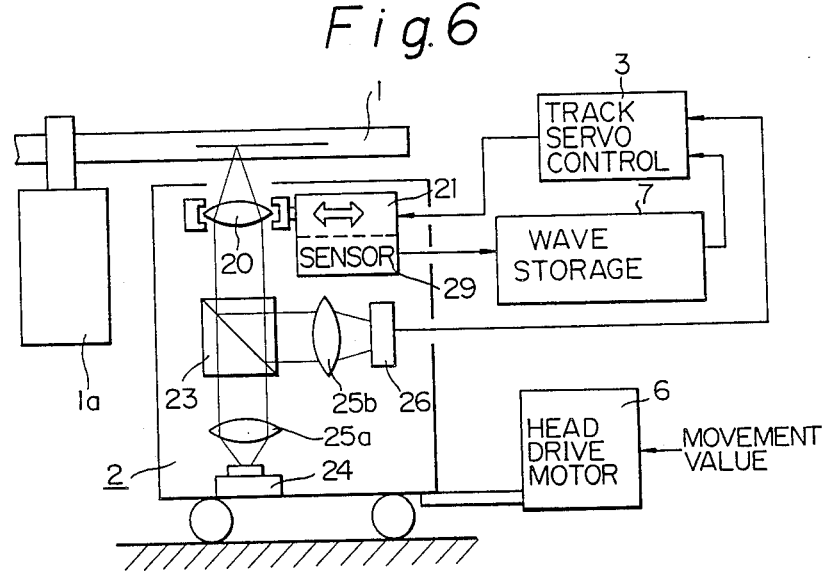
FIG. 6 is a block diagram of a track access control system in accordance with a first aspect of the present invention.

A description of the present invention will now be given. FIG. 6 shows a block diagram of a track access control system in accordance with the present invention. In the drawing, the same elements as shown in FIGS. 1 to 5 are given the same reference numerals.

Figure 7:
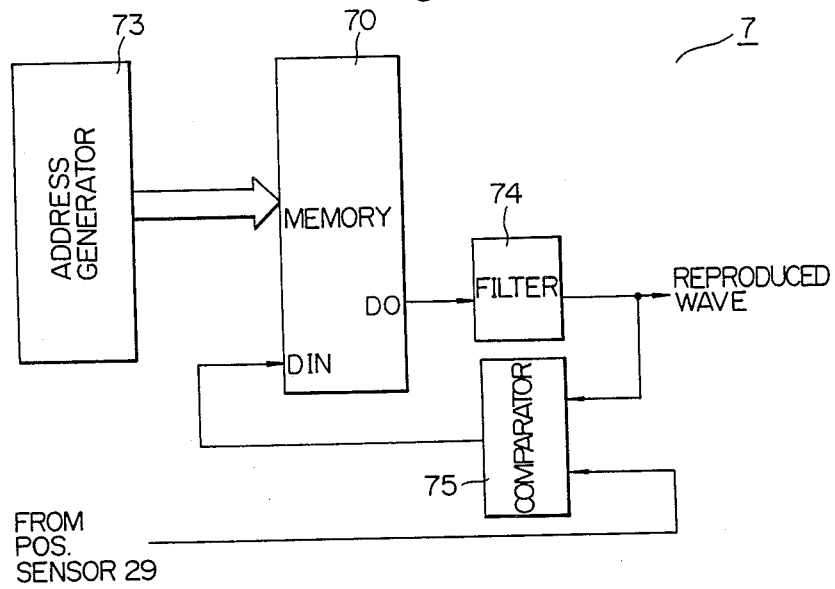
FIG. 7 is a block diagram of an eccentricity correction unit of the present invention.

According to the first embodiment of the present invention, a waveform storage unit 7 is configured as shown in FIG. 7. As shown in FIG. 7, the waveform storage unit 7 is composed of a memory 70, an address generator 73, a filter 74 generating a reproduced analogue eccentricity waveform signal from the data stored in the memory 70, and a comparator 75 which compares an output from the position sensor 29 with the reproduced analogue eccentricity waveform signal from the filter 74. Write data is generated by a delta modulation ($\Delta M$) method and stored in the memory 70.

The track actuator 21 is driven in accordance with the eccentricity data from the waveform storage unit 7. It is possible to store an input waveform signal, i.e., the output from the position sensor 29 into the waveform storage unit 7 and reproduce the input data from the waveform storage unit 7 without using an expensive A/D converter and D/A converter as in the conventional systems. The storage is carried out in an initial state, and the reproduction is carried out during servo control.

The filter 74 is an integrator, and therefore, is charged when the data is "1" and is discharged when the data is "0", to provide an integral waveform signal, so that the comparator 75 provides write data derived from the delta modulation of the input waveform signal, which can be stored as eccentricity information into the memory 70. Also, the data stored in the memory 70 can be integrated by the filter 75 to provide a reproduced waveform signal.

Accordingly, the waveform storage unit 7 of the present invention can be implemented by providing only the comparator 75 and filter 74 in addition to the memory 70, and thus expensive D/A and A/D converters are not required. Furthermore, it is not necessary to use the controller 5 for each data sample, and thus the recording and reproduction can be carried out continuously and easily controlled. Since the eccentricity correction is controlled by driving the track actuator 21, an open-loop stepping motor may be used in the optical head driver 6, and thus an expensive servo motor and servo control circuit are not required.

Figure 8:
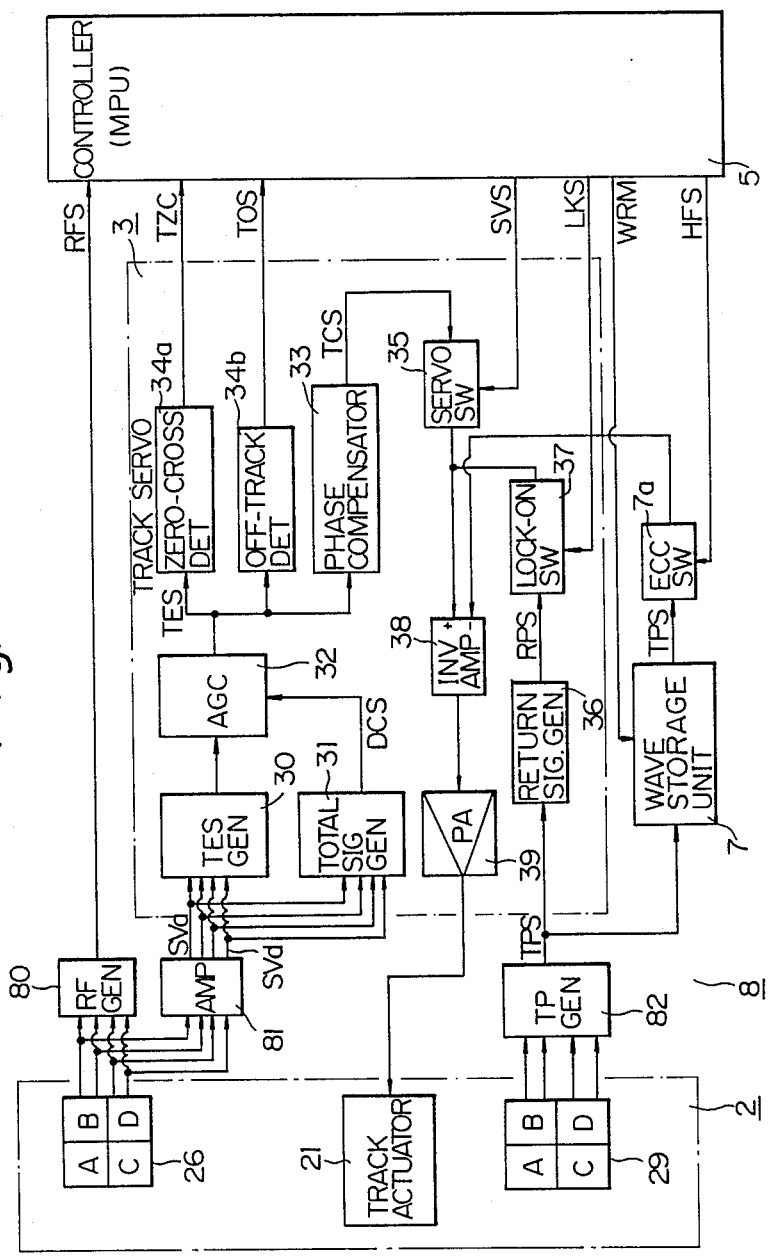
FIG. 8 is a circuit diagram of the track access control system shown in FIG. 6.
Figure 9:
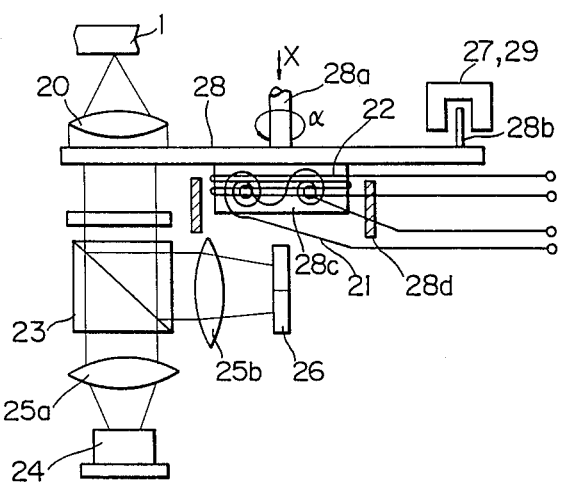
FIG. 9 is a view illustrating an optical head shown in FIG. 6.
Figure 10:
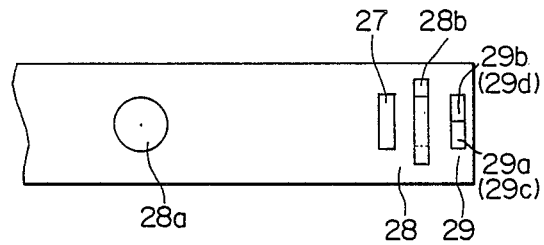
FIG. 10 is a view representing a structure of a position detector shown in FIG. 9.

A more detailed description will now be given. FIG. 8 is a circuit diagram of an embodiment of the present invention, and FIG. 9 shows the configuration of the optical head shown in FIG. 6. In the figures, the same elements as shown in FIGS. 2a and 2b, to 7 are given the same reference numerals.

First, the configuration of the optical head 2 will be explained below with reference to FIG. 9. In FIG. 9, the light beams from the semiconductor laser 24 are made parallel to one another by the collimator lens 25a. The parallel light beams are incident upon the beam splitter 23 and then upon the objective lens 20, which modifies the beams to form a beam spot BS. The light reflected from the optical disk 1 is incident upon the objective lens 20 and then upon the deflecting beam splitter 23, and the light from the beam splitter 23 is made incident upon the four-division photodetector 26 by the focusing lens 25b. The objective lens 20 is provided at one end of an actuator body 28 rotatable about a pivot 28a and having a fixed slit 28b provided at the other end thereof. The actuator body 28 is provided with a coil 28c, around which the focus coil 22 and a magnet 28d are provided, and at the lateral side of which a spiral track coil 21 is provided. Accordingly, when a current is supplied to the focus coil 22, the actuator 28 mounted on the objective lens 20 is moved up or down in the X-axis direction in the drawing in the same way as a voice coil motor, and thus the focusing position is changed. When the track coil 21 is supplied with a current, the actuator 28 is rotated in the direction of an arrow $\alpha$ about the pivot 28a, to change the focusing position to follow the track.

Figure 11A:
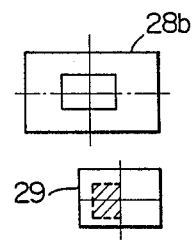
FIGS. 11a to 11c are views showing the operation of the detector shown in FIG. 10.
Figure 11B:
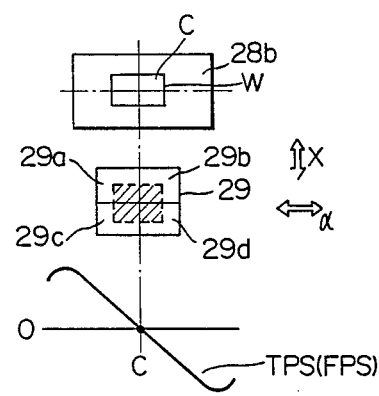
Figure 11C:
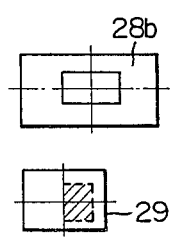

Position sensors 27 and 29 are provided opposite the fixed slit 28b provided on the end of the actuator 28. As shown in FIGS. 10, and 11a to 11c, the position sensors 27 (light source or light emitter) and 29 (a four division photodetector) are disposed such that the light source 27 (position sensor) and each of the photodetector sections 29a to 29d of the four-division photodetector 29 (position sensor) are opposite each other with the fixed slit 28b interposed therebetween. The fixed slit 28b has a window W provided therein through which the light from the light emitter or light source 27 (position sensor) is detected by the four-division photodetector sections 29a to 29d. The photodetection distribution on the four-division photodetector sections 29a to 29d varies in accordance with the distance moved by the actuator 28 in the direction of the arrow $\alpha$, and in the X-axis direction as shown in FIGS. 11a to 11c. Therefore, as for the focus and track servo control systems, a track-direction position signal TPS and focus-direction position signal FPS are determined, as shown below, from the outputs PA, PB, PC and PD of the photodetector sections 29a to 29d.

$$TPS = (PA + PC) - (PB + PD)$$

$$FPS=(PA+PB)-(PC+PD)$$

These position signals TPS and FPS are an S-shaped signal which is zero at the center thereof, for a deviation from the center C as shown in FIG. 11b. This S-shaped signal is used to provide an electrical elastic force in the direction of the center.

Next, the configuration shown in FIG. 8 will be explained below. Reference numeral 5 indicates a controller consisting of a microprocessor unit (MPU), which executes track access control according to the flowchart of track access operations shown in FIG. 15. Upon receiving an RF signal RFS, track zero-cross signal TZC, and an off-track signal TOS, the controller 5 delivers a servo ON signal SVS, lock-on signal LKS, storage/reproduction mode signal WRM, and an eccentricity ON signal HFS. Reference numeral 7a indicates an eccentricity switch which is turned ON by the eccentricity ON signal HFS from the controller 5 to deliver a reproduced eccentricity signal from the waveform storage unit 7 to the track servo controller 3. Reference numeral 8 indicates a head circuit composed of an RF generator 80 producing an RF signal RFS from the outputs Sa to Sd of the four-division photodetector 26, an amplifier 81 which amplifies the outputs Sa to Sd from the four-division photodetector 26 to deliver servo outputs SVa to SVd, and a TP generator 82 which produces a track position signal TPS from the outputs PA to PD of the four-division photodetector sections 29a to 29d of the position sensor 29. Reference numeral 30 indicates a TES generator which produces a track error signal TES from the servo outputs SVa to SVd from the amplifier 81; 31 indicates a total signal generator which produces a total signal DSC at a total reflection level, by adding the servo outputs SVa to SVd. Reference number 32 indicates an automatic gain control (AGC) circuit which divides the track error signal TES by the total signal DCS to provide an AGC signal based on the total reflection level as a reference value, to thereby correct variations of the projected beam intensity and reflection factor. 33 indicates a phase compensator which differentiates the track error signal TES, the gain of which has been controlled, and adds this signal to the proportional part of the track error signal TES, to thereby increase the high frequency phase. Reference numeral 34a indicates a zero-crossing detector which detects the zero-crossing point of the track error signal TES and delivers a track zero-cross signal TZC to MPU 5. 34b indicates an off-track detector which detects that the track error signal TES has become higher than a predetermined value Vo in the positive-moving direction and has become lower than a predetermined value (−Vo) in the negative-moving direction, i.e., when an off-track state is recognized, and delivers an off-track signal TOS to the MPU 5. Reference numeral 35 indicates a servo switch which closes when the servo ON signal SVS from MPU 5 is ON, to close the servo loop, and opens when the signal SVS is OFF, to open the servo loop. 36 indicates a return signal generator producing a return signal RPS which generates, of the track position signal TPS from the TP generator 82, a return force in the direction of track toward the center of the actuator 28 shown in FIG. 11b. Reference number 37 indicates a lock-on switch which closes when the lock-on signal LKS from MPU 5 is ON, to introduce the return signal RPS to the servo loop, and opens when the signal LKS is OFF, to block the introduction of the return signal RPS to the servo loop. 38 indicates an inverting amplifier which subtracts the output of the eccentricity switch 7a from the sum of the outputs from the servo switch 36 and lock-on switch 38 and inverts the result. 39 indicates a power amplifier which amplifies the output from the inverting amplifier 38 and delivers a track drive current TDV to the track actuator 21.

Figure 12:
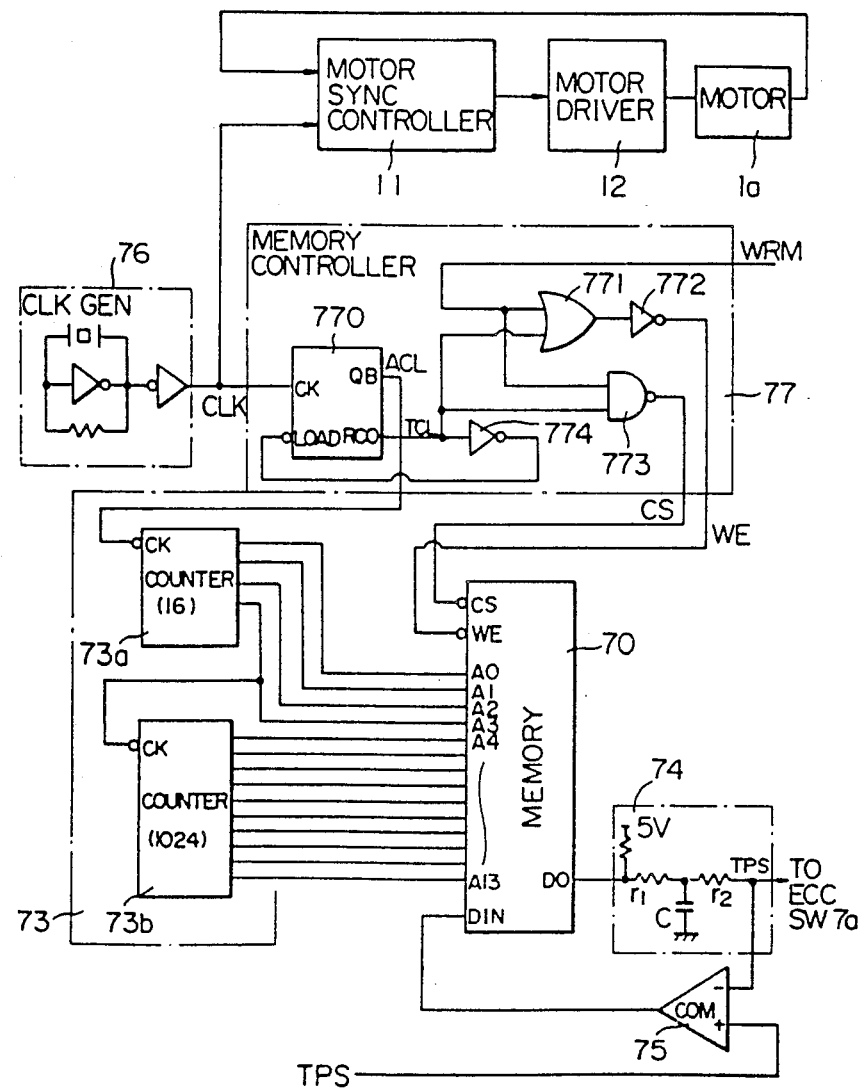
FIG. 12 is a circuit diagram of the eccentricity correction unit shown in FIG. 7.
Figures 13A, 13B, 13C, 13D, 13E, 13F, 13G:
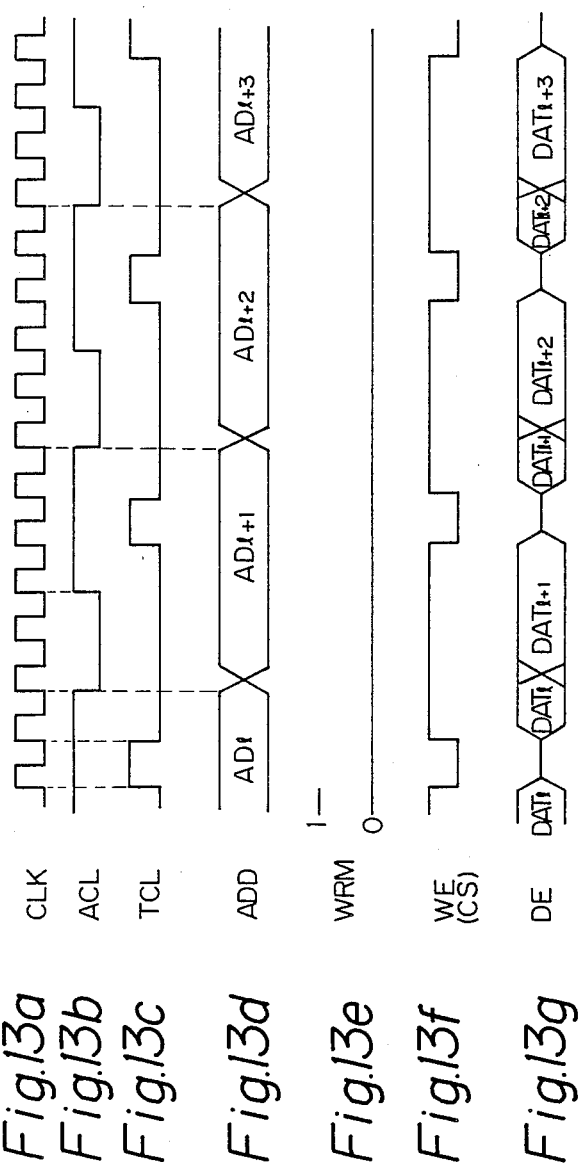
FIGS. 13a to 13g are timing charts representing the operation of the track access control system shown in FIG. 8.

FIG. 12 shows the construction of one embodiment of the waveform storage unit 7, and FIGS. 13a to 13g, and 14a to 14c show the operations of the waveform storage unit 7 shown in FIG. 12. In FIG. 12, the same elements as shown in FIGS. 6 to 8 are indicated by the same reference numerals. Reference numeral 76 indicates a clock generator having a quartz oscillator producing a clock CLK, as shown in FIG. 13a, and 77 indicates a memory controller which produces an address count clock ACL (FIG. 13b) from the clock CLK and produces a chip select signal CS or write enable signal WE (FIG. 13f) in accordance with the mode signal WRM from MPU 5. The memory controller 77 is composed of a synchronous counter 770 consisting of a quinary counter which counts clocks CLK, and delivers an address clock ACL as shown in FIG. 13b at the terminal QB thereof and a timing clock TCL, as shown in FIG. 13c, at the terminal RCO thereof. An OR gate 771 ORs the mode signal WRM and the timing clock to generate a write enable signal WE when the mode signal WRM is "0"(storage mode) and is inverted by an inverter 772. A NAND gate 773 ANDs the mode signal WRM and timing clock TCL to generate a chip select signal CS when the mode signal WRM is "1"(reproduction mode) and delivers the chip select signal as inverted. An inverter 774 inverts the timing clock TCL, to enable the synchronous counter 770 work as a quinary counter, and supplies the inverted timing clock to the load terminal of the counter 770.

The address generator 73 is provided to produce address bits A0 to A13 (14 bits) for accessing the 16-kbit memory cells of the memory 70, and includes a low-order address counter 73a which generates addresses A0 to A3 (low-order 4 bits) taking the address clock ACL as an input clock, and a high-order address counter 73b which generates addresses A4 to A13 (high-order 10 bits) taking the MSB output A3 of the address counter 73a.

The filter 74 includes a resistor r1, a capacitor C, and an output resistor r2, which together form an integrator. The data output Do of the memory 70 acts as voltage source, and the filter 74 is supplied with an input of 5V when Do="1" or 0V when the data output Do="0" and delivers the signal after a high frequency component is removed from the signal by the integration.

Reference numeral 11 indicates a motor synchronization controller which uses the position signal of a spindle motor 1a and the clock CLK to achieve speed and phase synchronization, thereby controlling the speed of a spindle motor 1a at a constant value, and 12 indicates a motor driver which drives the spindle motor 1a with the output from the motor synchronization controller 11.

The waveform storage and reproduction operation will be explained with reference to FIGS. 13a to 13g and FIGS. 14a to 14c. The clock CLK from the clock generator 76 is supplied to the sync counter 770 in the memory controller 77 which divides the clock CL by 5 to deliver address clocks ACL at the terminal QB thereof and timing clocks TCL at the terminal RCO.

The address clocks ACL are supplied to the low-order counter 73a, which counts the clocks with the trailing edge of the address clock ACL and updates the address. The timing clock TCL is generated as a delayed 1 clock period from the center of the period of the address clock ACL. Therefore, since the write enable signal WE and chip select signal CS are generated in the period of one address cycle, the output data Do at the address of the memory 70 is separated by the chip select signal CS and write enable signal WE, as shown in FIG. 13g.

Next, when a sinusoidal wave-shaped input position signal TPS is supplied, as shown in FIG. 14a, the reproduced output signal TPS' has an initial value of "0", since the data stored in the memory 70 are all "0". The comparison amplifier (comparator) 75 supplies the memory 70 with "1" as write data when the input position signal TPS is higher than the output TPS' or with "0" when the input position signal TPS is lower than the output TPS'.

In the storage mode, namely, before the access operation, the MPU 5 sets the mode signal WPM "0" to supply the memory 70 with the write enable signal WE, as shown in FIGS. 13f and 13c. Each time the write enable signal WE is supplied, the memory 70 writes write data from the comparison amplifier 75 to the specified address position specified by the address generator 73. For example, if the write data is "1" when an address $ADD_\alpha + 1$ is given to the memory 70, the data $DAT_\alpha + 1$ stored at the address involved is changed from "0" to "1" by the write enable signal, and thus the output Do of the memory 70 is also changed from "0" to "1". Namely, when "1" is stored in the memory 70, the output TPS' passed through the filter 74 has a higher voltage level than in the preceding status. Conversely, when "0" is stored, the output TPS' has a lower voltage level than in the preceding status. Therefore, since the output TPS' is initially lower than the input position signal TPS, as shown in FIG. 14a, the output from the comparison amplifier 75 is "1". When the output signal is stored into the memory 70 by the write enable signal WE, the output TPS' has a higher voltage level. Consequently, the output TPS' will finally follow the level of the input position signal TPS. As the address in the memory 70 changes as time passes, as described previously, the memory 70 will store the waveform of the input position signal TPS and deliver it as the output TPS'. Namely, when the input position signal TPS is supplied, write data Din is provided, as shown in FIG. 14b, so that the reproduced output TPS' from the filter 74, delivered as the output Do, will follow the input position signal TPS, i.e., the analogue waveform signal is modulated by the delta modulation method and is stored in the memory 70. The output TPS' is roughly represented in FIG. 14a for simplicity, but in practice, is a smoother signal closer to the input position signal TPS, since it is a result of about 16,000 samplings in one period of the input position signal TPS.

The clock CLK from the clock generator 76 is a reference clock for the spindle motor 1a, and thus the eccentricity waveform for one period, that is, for one full rotation of the optical disk, is stored in the memory 70 synchronously with the rotation of the optical disk 71.

When the mode signal WRM is "1" indicating the reproduction mode for the access operation the chip select signal CS is supplied from the NAND gate 73, stored write data is delivered at the output DO, as shown in FIG. 13g, and the reproduced signal TPS' is delivered from the filter 74. At this time, since a write enable signal WE is not generated, writing is not carried out.

The waveform storage unit 7 described above can store and reproduce an analogue waveform signal without using the A/D converter and the D/A converter, and can be constructed by using an inexpensive amplifier and filter, which leads to a considerable reduction of manufacturing costs. Also, since only a minimum quantity of the MPU 5 is needed, the present invention can provide a very economic track access control system.

Figure 15:
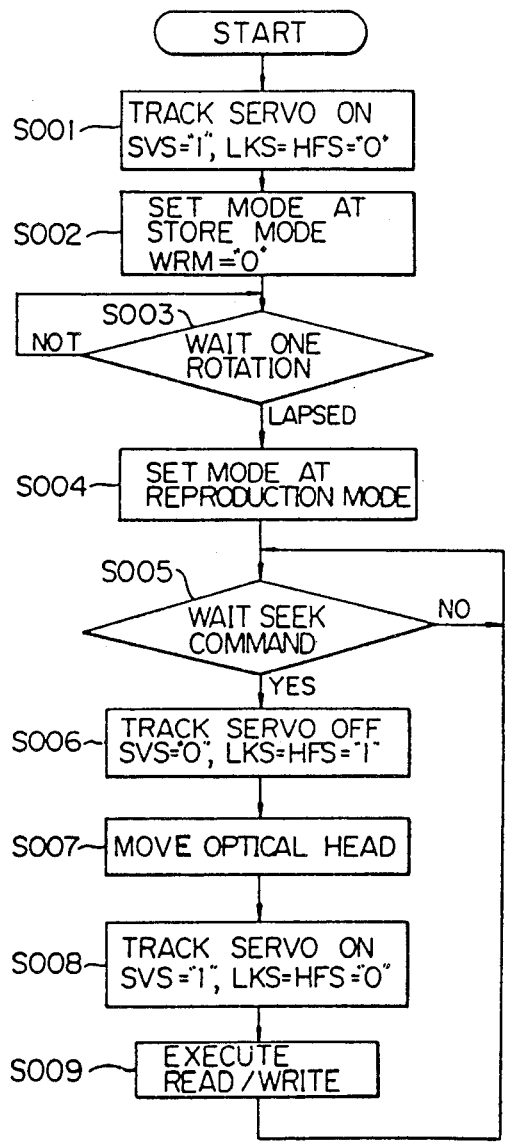
FIG. 15 is a flowchart representing the operation of the track access control.

FIG. 15 is a flow chart of track access operations in the embodiment of the present invention.

Step 001 (S001)

After the power supply is turned ON and the optical disk is replaced, the MPU 5 turns ON the track servo control. Namely, the servo-on signal SVS is made "1" to close the servo switch 35 shown in FIG. 8, thereby forming a servo loop with the track error signal TES. The lock-on switch 37 and the eccentricity switch 7a are kept ON and the lock-on signal LKS and the eccentricity-on signal HFS remain at "0". As a result, the track servo pull-in operation is started such that the light beam BS follows the track.

Step 002 (S002)

When the off-track signal TOS is not generated for a predetermined period and the track zero-cross signal TZC is not inverted for a predetermined time, the MPU 5 judges that the track servo pull-in operation is complete. In this state, the light beam BS is made to follow the track, by the track actuator 21, and the track position signal TPS from the position sensor 29 has a waveform in accordance with the operation of the track actuator 21, i.e., it follows operation of the light beam BS. Namely, an eccentricity waveform signal of the optical disk is delivered, and at this time the MPU 5 sets the mode signal WRM "1" to designate the storage mode to the memory controller 77 in the waveform storage unit 7. As a result, the track position signal TPS, for one full rotation of the optical disk 1, as the eccentricity signal, from the position sensor 29 is stored in the memory 70. The MPU 5 sets the mode signal WRM "1" in accordance with the home position signal indicating one full rotation of the optical disk 1, and continues to set the mode signal WRM "1" for a period of one full rotation of the optical disk 1, i.e., until a next position signal arrives.

Step 003 (S003) and Step 004 (S004)

When the optical disk 1 has rotated one full turn, the MPU 5 changes the mode signal WRM from "1" to "0" and a reproduction mode instruction is sent to the waveform storage unit 7. Accordingly, track position signals TPS for one full rotation of the optical disk 1 are stored to the waveform storage unit 7. At this time, even if the waveform storage unit 7 delivers the reproduced waveform TPS' with the mode signal WRM of "1", the eccentricity waveform signal is not supplied to the track servo controller 3 since the eccentricity switch 7a is still OFF. Consequently, the light beam is made to follow the track under track servo control.

Step 005 (S005)

The MPU 5 waits for a seek command from a host controller (not shown).

Step 006 (S006)

When the seek command from the host controller arrives at the MPU 5, the MPU 5 turns OFF the track servo control for the light beam. Namely, the MPU 5 makes the servo-on signal SVS "0" and turns OFF the servo switch 35, thereby opening the track servo loop and making both the lock-on signal LKS and the eccentricity signal HFS "1". As a result, the lock-on switch 37 is turned ON and the eccentricity switch 7a is also turned ON. Accordingly, the return control signal RPS from the return signal generator 36, derived from the track position signal TPS, is supplied to a non-inverted input terminal (+) of the inverting amplifier 38 and the reproduced eccentricity waveform signal RPS' from the waveform storage unit 7 is supplied to the inverted input terminal (−) of the inverting amplifier 38. The actuator 28 of the optical head 2 is driven by the track coil 21 in accordance with the eccentricity waveform signal TPS', using the return control signal RPS as a feed-back signal, and is moved along the eccentricity waveform derived from the stored light beam BS.

Step 007 (S007)

The MPU 5 drives the optical head driver: stepping motor 6 a number of steps required to reach the target track, thereby moving the optical head 2 to the target track.

Step 008 (S008)

The MPU 5 turns ON the track servo control after driving the stepping motor 6. Namely, the MPU 5 turns ON the servo-on signal SVS to close the servo switch 35, thereby starting the servo pull-in. In other words, the track error signal TES generated by the TES generator 30, to which a gain is imparted through the AGC in the AGC circuit 32, is phase-compensated in the phase compensator 34 and supplied to the inverting amplifier 38 through the servo switch 35, to form a servo loop with the track error signal TES. The MPU 5 makes both the lock-on signal LKS and eccentricity signal HFS "0" to turn OFF the lock-on switch 37 and eccentricity switch 7a, and therefore, the return control signal RPS and reproduced eccentricity waveform TPS' are not supplied to the inverting amplifier 38. Namely, since the light beam has been under an eccentricity correction control until the servo control is turned ON, the frequency of the track error signal TES after the optical head 2 is moved is low and the servo control is turned ON in that state, and thus the pull-in of the servo control is easily achieved. The pull-in of the servo control can be started when the track error signal TEST has a low frequency, and thus only a short time is needed for the pull-in of the servo control.

Step 009 (S009)

Thereafter, when the MPU 5 receives a read or write command from the host controller, it executes a read/write operation and then returns to step 005.

As described above, the actuator can be moved in accordance with the eccentricity data of the optical disk 1, even when the track servo is OFF, so that the speed of the actuator in relation to the track is low. In this state, the track servo control can be turned ON to carry out the pull-in of the track servo control in a short time.

In addition, the configuration of the waveform storage unit can be simplified, and an inexpensive stepping motor can be used for the optical head driver 6, and thus the track access control system can be provided at a low manufacturing cost according to the present invention.

Another embodiment will be described. In the first embodiment described above the waveform storage unit 7 shown in FIG. 12 is used but the waveform storage unit 7 may be any other well-known element. The track actuator is driven by an eccentricity waveform signal, but the motor in the optical head driver 6 may instead be driven with the eccentricity waveform signal. Furthermore, the first embodiment has been described with regard to a reflection-type optical disk unit, but the present invention may be applied to a transmission-type optical disk unit. The photodetector 26 described previously is a four-division type and may be any well-known photodetector which provides a tracking error signal, such as a two-division type photodetector, and the generation of the track error signal is not limited to the push-pull method, and any other appropriate method may be used. According to a first aspect of the present invention, it is possible, by using a waveform storage unit having a simple configuration, to reduce the time needed for a pull-in of a track servo control and to improve the access speed by controlling the eccentricity correction. Further, the track access speed can be improved at a lower cost. By effecting the eccentricity correction control with respect to the track actuator, it is possible to improve the access speed without using an expensive drive motor, namely, at a lower cost.

A second aspect of the present will now be described. For the above-mentioned eccentricity correction control, eccentricity information must be obtained and written into the waveform storage unit 7 by activating the track servo controller 3, making the light beam follow a track, and detecting the motion of the light beam as a position signal. At this time, the track at which the light beam is aimed is unknown. Therefore, when the pull-in of the track servo control is achieved at the point $P_a$ shown in FIG. 16, the position signal appears as curve TPSa. When the pull-in of the track servo control is achieved at the point $P_b$, the position signal appears as curve TPSb. That is, the position signal will deviate from that shown by curve TSPr when the mean position of the light beam is at the center of the range for the following track. This deviated position signal can also be used as eccentricity information, but if the pull-in of the track servo control is carried out by storing and reproducing the eccentricity information to and from the waveform storage unit 7, the light beam is moved to a position deviated from the center of the following range. The follow range of the light beam has a predetermined width in either the positive (or outer) and negative (or inner) directions around the follow range, and therefore, if the center of leading the light beam deviates, the follow range of the light beam after the light beam is moved will change due to that deviation, and thus the range will have a different width at the outer and inner sides. Consequently, the eccentricity correction control causes a change of the range of the lens seek operation in which a target track is sought by the light beam, and thus the performance of the lens seek is degraded. Another object of the present invention is to provide for controlling the storing of eccentricity information in the optical disk unit, by which it is possible to store eccentricity information in accordance with which the mean position of the position signal falls at least in the following range of the light beams, and more preferably, is placed, in the center of the follow range of the light beam.

Figure 16:
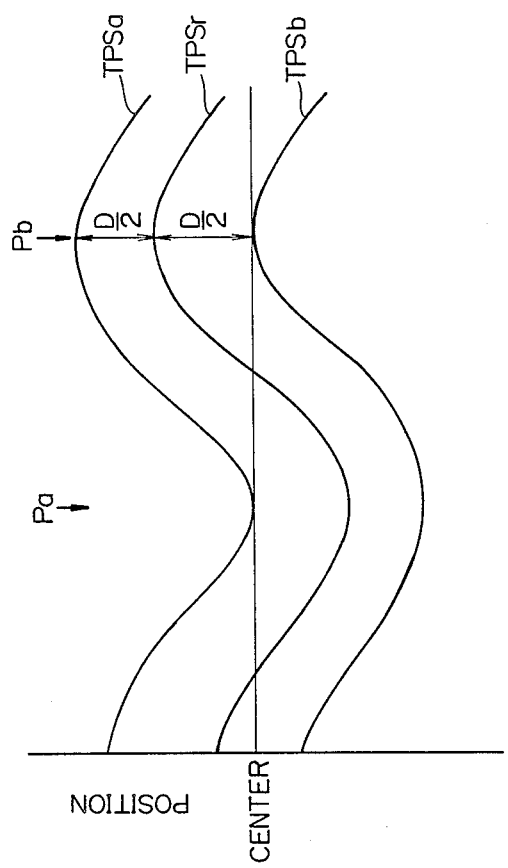
FIG. 16 is a graph representing eccentricity waveforms.
Figure 17:
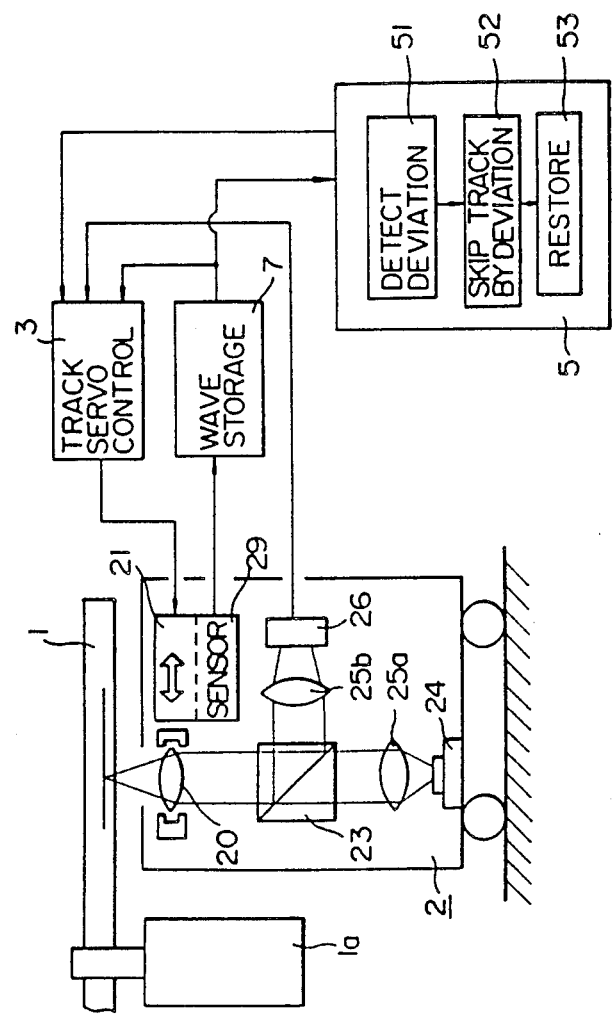
FIG. 17 is a block diagram of a track access control system in accordance with a second aspect of the present invention.
Figure 18:
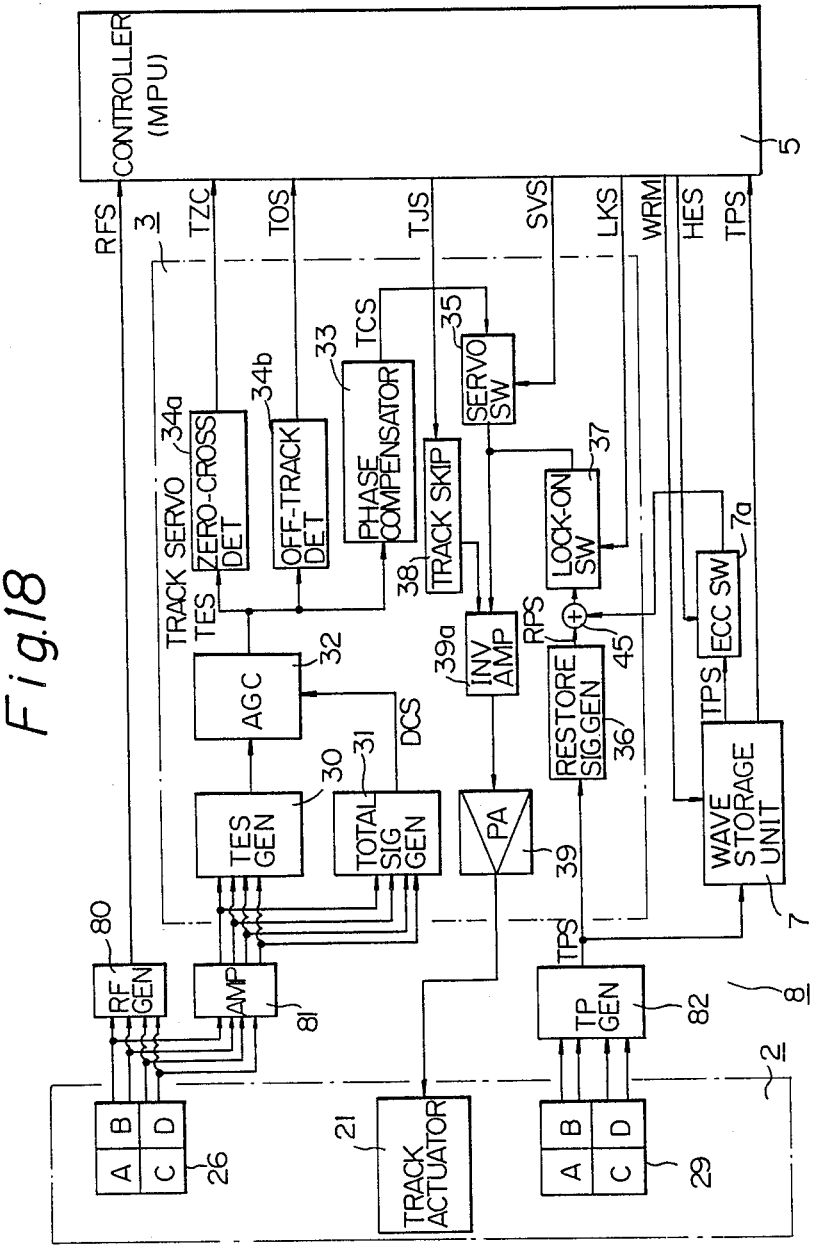
FIG. 18 is a circuit diagram of the track access control system shown in FIG. 17.

FIG. 17 shows a block diagram of the present invention. In the drawing, the same elements as shown in FIG. 6 are indicated by the same reference numerals. A controller 5, which is comprised of the MPU in FIG. 8, further includes deviation detection means 51, a track skip means 52 and a re-storage means 53. The controller 5 reads the eccentricity information from the waveform storage unit 7, and checks for any deviation from the center of the follow-up range. If a deviation is found, the light beam skips tracks for the deviation by the track servo controller 3, and then the output of the position sensor 29 is written into the waveform storage unit 7. More specifically, the eccentricity information once written in the waveform storage unit 7 is reproduced and checked for deviation. Assuming that the amount of decentering is a distance D, then the deviation is plus or minus (+/−)D/2, as shown in FIG. 16. To eliminate this deviation, the light beam skips tracks for the length of deviation, and the output of the position sensor 29 is again written as eccentricity information into the waveform storage unit 7. By repeating the above, eccentricity information TPSr can be obtained, in accordance with which the mean position of the position signal falls in the center of the follow range of the light beam, and this information can be written to the waveform storage unit 7. As a result, the eccentricity correction control is carried out at the center of the follow-up range in accordance with the eccentricity information, the pull-in of the track servo control also can be carried out at the center of the follow range, whereby a change in follow range can be prevented. Note, although the eccentricity information is supplied as input to the track servo controller 3, to correct the eccentricity data by driving the track actuator 3, the optical head driver 6 may be driven in accordance with the eccentricity information. FIG. 18 is a diagram of one embodiment of the present invention, and corresponds to FIG. 8. In the drawing, the same elements as shown in FIG. 8 are indicated by the same reference numerals. In FIG. 18, a track skip voltage generator 38 and an adder 45 are provided in addition to the circuit shown in FIG. 8. An output from the eccentricity switch 7a is supplied to the adder 45, added to the return control signal RPS from the position signal generator 36, and supplied to the lock-on switch 37. The MPU 5 outputs a track jump (skip) signal TJS to the track skip voltage generator 38.

FIG. 19 is a flow chart showing an adjustment of the eccentricity waveform which is obtained by the operation shown in FIG. 15. FIG. 20 is a graph showing the adjustment operation.

Step 101 (S101)

The MPU 5 makes the mode signal WRM "1" and instructs the memory controller 77 of the waveform storage 7 to enter the storage mode. The write enable signal WE is generated from the memory controller 77, and thus the track position signal from the position sensor 29 is stored as the eccentricity information to the memory 70. When a time of one full rotation of the optical disk 1 has passed, the MPU 5 makes the mode signal WRM "0" and instructs the memory controller 77 to enter the reproduction mode. The generation of the write enable signal WE is inhibited, and the chip select signal CS is generated, so that the memory 70 is read while the write operation is inhibited.

Step 102 (S102)

The MPU 5 turns OFF the track servo control, i.e., turns OFF the servo-on signal SVS and opens the servo switch 35 to stop the track follow control by the track error signal TES. Also, the eccentricity-on signal HFS is kept OFF and the eccentricity switch 7a is opened to inhibit a supply of the reproduced eccentricity signal TPS' from the waveform storage unit 7 to the inverting amplifier 39a. Furthermore, the lock-on signal LKS is turned ON to close the lock-on switch 37, thereby supplying a return signal RPS to the inverting amplifier 39a through the adder 45 and the lock-on switch 37. The track actuator 21 is driven with the track position signal TPS and locked at the central position.

Step 103 (S103)

Figure 20A:
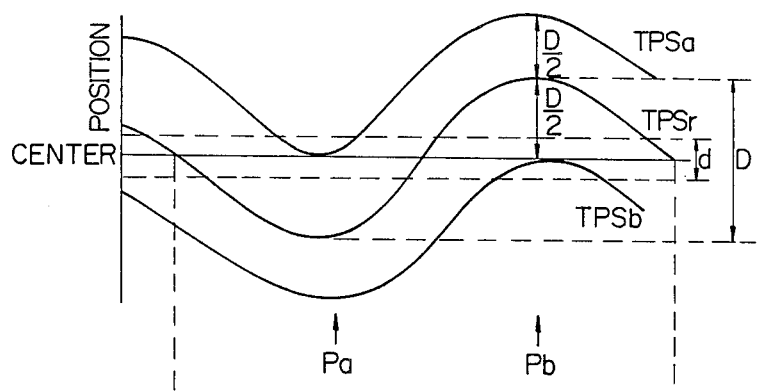
FIGS. 20a to 20d are graphs illustrating the operation of the eccentricity adjustment of the track access control system.
Figure 20B:
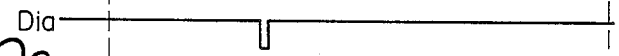
Figure 20C:
Figure 20D:
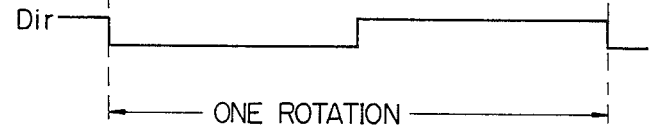

At this time, the memory 70 is in the reproduction mode and delivers reproduced eccentricity information TPS' from the filter 74 shown in FIG. 12, and the waveform of the information is between TPSa and TPSb due to the start position of the pull-in of the track servo, as shown in FIG. 20a. The track actuator 21 is locked at the central position, the track position signal TPS for entry into the comparison amplifier 75 is at the central level (for example, 0V). The comparison amplifier 75 delivers comparison outputs Dia, Dib and Dir derived from slicing the reproduced eccentricity waveform signal TPS' at the central level, as shown in FIGS. 20b to 20d. Upon receiving the comparison outputs from the comparison amplifier 75, MPU 5 measures the duty for one period. Namely, the MPU 5 samples the comparison outputs at a predetermined interval for a time of one full rotation of the optical disk 1 and counts the periods during which the comparison output is "1" and those during which the comparison output is "0" to determine the ratio (duty) therebetween.

For example, if the position deviates in the outer direction like TPSa shown in FIG. 20a, the comparison output Dla shown in FIG. 20b is obtained. In this case, the majority of the periods are "1", and thus the duty is about 100%. When the position deviates in the inner direction, e.g., TPSb, the comparison output Dib is obtained. In this case, almost all the periods are "0", and thus the duty is about 0%. If very little deviation occurs, the reproduced eccentricity waveform TPSr shown in FIG. 20a is produced and the comparison output is Dir, as shown in FIG. 20d. In this case, the duty is about 50%.

Step 104 (S104)

Based on this duty, the MPU 5 determines whether the position is too far in or too far of out. A margin width, which may be plus or minus (+ or −) 10%, is set and the MPU 5 checks to see if the calculated duty is within 50%+ or −α. If the duty is less than 50%−α%, the MPU 5 judges that the positions is too far in. When the duty is more than 50%+α%, the MPU 5 judges that the position is too far out.

Steps 105 to 107 (S105 to S107)

After judging that the position is too far in or too far out, the MPU 5 calculates, from the abovementioned duty, the amount of deviation from the center. For example, assume that the amount of the eccentricity value is D, at a duty of 10%, the position deviation is +D/2, and at a duty of 0%, the position deviation is −D/2. The amount of the eccentricity value D is calculated by the MPU 5 by counting the number of inversions of the zero-cross signal TZC for a time of one full rotation of the optical disk 1.

After calculating an amount of deviation, the MPU 5 turns ON the eccentricity-on signal HFS and lock-on signal LKS to turn OFF the eccentricity switch 7a and lock-on switch 37. As described at step 005 (S005) with reference to FIG. 15, the light beam is moved in accordance with the eccentricity waveform signal. Next, the MPU 5 turns ON the servo-on signal SVS to close the servo switch 35, thereby forming a servo loop of the track error signal TES, and turns OFF the lock-on signal LKS to turn OFF the lock-on switch 37. As a result, the light beam is moved in accordance with the eccentricity waveform signal TPS' and stack error signal TES, to pull-in the track servo control.

Steps 108 and 109 (S108 and S109)

When the pull-in of the track servo control is completed, the MPU 5 sends a track skip signal TJS to the track skip voltage generator 38, to generate a track skip voltage, and thus the track skip voltage is applied to the inverting amplifier 39a to drive the track actuator 21 to make the light beam skip tracks for the amount of deviation, thereby effecting a lens seek.

Further, the MPU 5 turns OFF the eccentricity-on signal HES to write the eccentricity waveform, signal to turn OFF the eccentricity switch 7a, and then returns to step 101 (S101).

Step 110 (S110)

When MPU 5 judges at step 104 (S104) that the amount of deviation from the center is within the range of the margin, the write control is terminated.

Accordingly, to acquire eccentricity information from a real track position signal TPS, the MPU 5 reads the eccentricity information stored in the memory 70 checks the duty for detecting an amount of deviation, and skips the light beam over tracks for the amount of the deviation, thereby acquiring eccentricity information by which no deviation is obtained. Furthermore, in this embodiment, using the outputs from the comparison amplifier 75 in the waveform storage unit 7 while the lock-on signal LKS is turned ON, the MPU 5 can detect a deviation, and thus a deviation of the light beam can be easily detected. In addition, since the eccentricity waveform signal is a sinusoidal wave, it is not necessary to store same for one full rotation of the optical disk, and the waveform signal may be stored for a half of the full rotation of the optical disk and a signal derived from inversion of the waveform used for the other half rotation of the disk. According to the second aspect of the present invention, it is possible to write an eccentricity waveform signal for the eccentricity correction control in which the center of the signal falls in the center of the follow range, and the eccentricity correction control does not cause the follow range to vary, whereby it is possible to prevent a degrading of the following performance.

In the above embodiments, the track access control system for the optical disk units were described, however, the track access control system of the present invention can be applied to a variety of disk system, for example, a magnetic disk system, etc. In addition, the wave storage unit 7 of the present invention can be applied to a variety of systems.

Many widely different embodiments of the present invention may be constructed without departing from the spirit and scope of the present invention. It should be understood that the present invention is not limited to the specific embodiments described in this specification, except as defined in the appended claims.

What is claimed is:

1. A track access control system for use in a disk storage system including: a rotatable recording disk having a plurality of tracks, on which data is recorded and from which data is read, formed along a rotation direction of the rotatable disk; a data recording and reading head movable in a radial direction across the disk; track actuator means for moving the head in a radial direction of the disk; and a track error sensor for detecting a track error signal in response to a signal read through the head, said control system comprising:
  track servo control means, operatively connected to the track error sensor and the track actuator means, for positioning the head at a desired position through the track actuator means in response to the track error signal from the track error sensor; and
  eccentricity correction means, operatively connected to the track error sensor, and operatively connected to said track servo control means to cooperate therewith, for detecting an eccentricity of one of the tracks at a first condition, storing said eccentricity, and compensating said eccentricity of the track together with said track servo control means at a second condition after said first condition, said eccentricity correction means comprising:
  eccentricity detecting means for detecting said eccentricity and producing eccentricity data in response to a deviation of the track for at least a half rotation of said disk;
  eccentricity wave signal storage means for storing digital eccentricity data and comprising:
    a memory;
    an address generation circuit operatively connected to said memory;
    a filter connected to an output of said memory; and
    a comparator having a first input connected to an output of said filter, a second input connected to said eccentricity detecting means to receive said eccentricity data, and an output connected to an input of said memory;
    said address generation circuit generating an address for said memory in response to a rotation of said disk, said filter producing an analog reproduction eccentricity wave signal in response to data stored in said memory, said comparator comparing said analog reproduction eccentricity wave signal with said received eccentricity and outputting the digital eccentricity data comprising a polygonal line shaped sinusoidal eccentricity signal; and
  eccentricity compensation means for receiving said analog reproduction eccentricity wave signal from said filter and adding said received reproduction eccentricity wave signal to the track error signal compensating said eccentricity.

2. A track access control system according to claim 1, wherein said memory comprises a random access memory into which said digital eccentricity data is stored during only said first condition and from which said digital eccentricity data is read during only said second condition, and wherein said address generation circuit comprises counter means for receiving a rotation signal and generating an address for said memory in response to said rotation signal.

3. A track access control system according to claim 2, wherein said rotation signal is a clock signal generated by a clock generator, and said clock signal driving said rotatable recording disk.

4. A track access control system according to claim 3, wherein said filter comprises:
   a resistor connected to said memory; and
   a capacitor connected to said resistor and said comparator, said resistor and said capacitor forming a first-order delay circuit.

5. A track access control system according to claim 1, wherein said eccentricity correction means further comprises controllable eccentricity detecting means for detecting controllable eccentricity data for at least at a half rotation of said disk, said controllable eccentricity data falling in a follow range of light beams produced by the head throughout all tracks of said disk.

6. A track access control system according to claim 5, wherein said controllable eccentricity detecting means detects optimum controllable eccentricity data falling in a center of said follow range.

7. A track access control system according to claim 6, wherein said controllable eccentricity detecting means comprises:
   deviation detecting means for detecting a deviation of said eccentricity data for at least a half rotation of said disk from said eccentricity data stored in said memory;
   track skip means, operatively connected to said deviation detecting means, for skipping the head via the track actuator means by said detected deviation;
   eccentricity detecting and updating means for detecting adjusted eccentricity data adjusted by said skip operation of the head, and updating said digital eccentricity data in said eccentricity wave signal storage means as the polygonal line shaped sinusoidal eccentricity signal; and
   optimum eccentricity detection control means for detecting said optimum eccentricity for at least a half rotation of said disk and controlling operations of said deviation detecting means, said track skip means and said eccentricity detecting and updating means to sequentially continue operations until said optimum eccentricity is detected.

8. A track access control system according to claim 7, wherein said detection of said eccentricity and/or said detection of said optimum eccentricity data are carried out in one full rotation of said disk.

9. A track access control system according to claim 8, wherein said memory comprises a random access memory into which said eccentricity and/or said optimum eccentricity data are stored during only said first condition and from which said eccentricity and/or optimum eccentricity data are read during only said second condition, and wherein said address generation circuit comprises counter means for receiving a rotation signal and generating an address for said memory in response to said rotation signal.

10. A track access control system according to claim 9, wherein said rotation signal is a clock signal generated by a clock generator, and said clock signal driving said rotatable recording disk.

11. A track access control system according to claim 9, wherein said filter comprises:
   a resistor connected to said memory; and
   a capacitor connected to said resistor and said comparator, said resistor and said capacitor forming a first-order delay circuit.

12. A track access control system according to claim 1, wherein the track actuator means comprises a first moving unit, and a second moving unit mounted on said first moving unit, said first moving unit moving the head more than one track, and said second moving unit finely moving the head at the track after completion of the movement by said first moving unit.

13. A track access control system for use in a disk storage system including: a rotatable recording disk having a plurality of tracks, on which data is recorded and from which data is read, formed along a rotation direction of the rotatable disk; a data recording and reading head which is movable in a radial direction across the disk; track actuator means for moving the head in a radial direction of the disk; and a track error sensor for detecting a track error signal in response to a signal read through the head, said control system comprising:
   track servo control means, operatively connected to the track error sensor and the track actuator means, for positioning the head at a desired position through the track actuator means in response to the track error signal from the track error sensor; and
   eccentricity correction means, operatively connected to the track error sensor, and operatively connected to the track error sensor, and operatively connected to said track servo control means to cooperate therewith, for detecting an eccentricity of said tracks at a first condition, storing said eccentricity, and compensating said eccentricity of said track together with said track servo control means at a second condition after said first condition, said eccentricity correction means comprising:
   eccentricity detecting means for detecting said eccentricity and producing eccentricity data in response to a deviation of said track for at least half rotation of said disk;
   eccentricity wave signal storage means for storing digital eccentricity data and comprising:
   a memory;
   an address generation circuit connected to said memory;
   a filter connected to an output of said memory; and
   a comparator having a first input connected to an output of said filter, a second input connected to said eccentricity detecting means to receive said eccentricity data, and an output connected to an input of said memory;
   said address generation circuit generating an address for said memory in response to a rotation of said disk, said filter producing an analog reproduction eccentricity wave signal in response to data stored in said memory, said comparator comparing said analog reproduction eccentricity wave signal with said received eccentricity and outputting the digital eccentricity data comprising a polygonal line shaped sinusoidal eccentricity signal;
   eccentricity compensation means for receiving said analog reproduction eccentricity wave signal from said filter and adding said received reproduction eccentricity wave signal to the track error signal; and controllable eccentricity detecting means for detecting controllable eccentricity data for at least a half rotation of said disk, said controllable eccentricity data falling in a following range of light beams produced by the head throughout all tracks of said disk.

14. A track access control system according to claim 13, wherein said controllable eccentricity detecting means detects optimum controllable eccentricity data falling in a center of said following range.

15. A track access control system according to claim 14, wherein said controllable eccentricity detecting means comprises:
    deviation detecting means for detecting a deviation of said eccentricity data for at least a half rotation of said disk from said eccentricity data stored in said memory;
    track skip means, operatively connected to said deviation detecting means, for skipping the head via the track actuator means by said detected deviation;
    eccentricity detecting and updating means for detecting adjusted eccentricity data adjusted by said skip operation of the head, and updating said digital eccentricity data in said eccentricity wave signal storage means as the polygonal line shaped sinusoidal eccentricity signal; and
    optimum eccentricity detection control means for detecting said optimum eccentricity for at least a half rotation of said disk and controlling operation of said deviation detecting means, said track skip means and said eccentricity detecting and updating means to sequentially continue operations until said optimum eccentricity is detected.

16. A track access control system according to claim 15, wherein said detection of said eccentricity and/or said detection of said optimum eccentricity data are carried out in one full rotation of said disk.

17. A track access control system according to claim 16, wherein said memory comprises a random access memory into which said eccentricity and/or said optimum eccentricity data are stored during only said first condition and from which said eccentricity and/or said optimum eccentricity data are read during only said second condition, and wherein said address generation circuit comprises counter means for receiving a rotation signal and generating said address for said memory in response to said rotation signal.

18. A track access control system according to claim 8, wherein said rotation signal is a clock signal generated by a clock generator, and said clock signal driving said rotatable recording disk.

19. A track access control system according to claim 9, wherein said filter comprises:
    a resistor connected to said memory; and
    a capacitor connected to said resistor and said comparator, said resistor and said capacitor forming a first-order delay circuit.

20. A track access control system according to claim 13, wherein the track actuator means comprises a first moving unit, and a second moving unit mounted on said first moving unit, said first moving unit moving the head at the track after completion of the movement by said first moving unit.

21. A signal storage system, comprising:
    a memory;
    an address generation circuit connected to said memory;
    a filter connected to an output of said memory; and
    a comparator having a first input connected to an output of said filter, a second input receiving an analog input signal, and an output connected to an input of said memory, said address generation circuit generating an address signal for said memory in response to a clock signal, said filter producing an analog reproduction signal in response to data stored in said memory, and said comparator comparing said analog reproduction signal with said analog input signal and outputting digital data to said memory.

22. A signal storage system according to claim 21, wherein said input analog signal comprises a sinusoidal wave, and said filter reproduces the analog sinusoidal reproduction signal.

23. A signal storage system according to claim 22, wherein said filter comprises:
    a resistor connected to said memory; and
    a capacitor connected to said resistor and said comparator, said resistor and said capacitor forming a first-order delay circuit.

24. A signal storage system according to claim 23, wherein said memory comprises a random access memory into which said analog input signal is stored during only a first condition and from which said data is read during only a second condition after said first condition, and wherein said address generation circuit comprises counter means for receiving said clock signal and generating said address signal for said memory in response to said clock signal.

25. A track access control system, comprising:
    a head having a tracking coil and a coil position sensor;
    a tracking servo control unit operatively connected to the coil and controlling tracking by the coil; and
    waveform storage means, operatively connected to the sensor and said control unit, for providing delta modulation and integration tracking control.

26. A track access control system, comprising:
    a head having a tracking coil and a coil position sensor;
    a tracking servo control unit operatively connected to the coil and controlling tracking by the coil; and
    a waveform storage unit operatively connected to the sensor and said control unit, and said storage unit comprising:
        a memory storing a correction waveform;
        an integrating filter, operatively connected to said memory and said control unit, for integrating the correction waveform to produce a correction signal; and
        a comparator, operatively connected to said filter, said memory and the sensor, for producing the correction waveform by comparing the correction signal and a position signal produced by the sensor.

27. A track access control system, comprising:
    a head having a tracking coil and a coil position sensor;
    a tracking servo control unit operatively connected to the coil and controlling tracking by the coil; and
    a waveform storage unit operatively connected to the sensor and said control unit, and said storage unit comprising:
        a memory storing a correction waveform;
        an integrating filter, operatively connected to said memory and said control unit, for integrating the correction waveform to produce a correction signal;

a comparator, operatively connected to said filter, said memory and the sensor, for producing the correction waveform by comparing the correction signal and a position signal produced by the sensor; and optimization means for optimizing the correction waveform.

* * * * *

UNITED STATES PATENT AND TRADEMARK OFFICE
CERTIFICATE OF CORRECTION

PATENT NO. : 4,985,882

DATED : Jan. 15, 1991

INVENTOR(S) : Shiegeyoshi Tanaka et al

It is certified that error appears in the above-identified patent and that said Letters Patent is hereby corrected as shown below:

Columns 19 and 20 should be added as per attached sheets.

Signed and Sealed this

Twenty-eighth Day of July, 1992

Attest:

DOUGLAS B. COMER

Attesting Officer

Acting Commissioner of Patents and Trademarks condition, and wherein said address generation circuit comprises counter means for receiving a rotation signal and generating an address for said memory in response to said rotation signal.

3. A track access control system according to claim 2, wherein said rotation signal is a clock signal generated by a clock generator, and said clock signal driving said rotatable recording disk.

4. A track access control system according to claim 3, wherein said filter comprises:
   a resistor connected to said memory; and
   a capacitor connected to said resistor and said comparator, said resistor and said capacitor forming a first-order delay circuit.

5. A track access control system according to claim 1, wherein said eccentricity correction means further comprises controllable eccentricity detecting means for detecting controllable eccentricity data for at least at a half rotation of said disk, said controllable eccentricity data falling in a follow range of light beams produced by the head throughout all tracks of said disk.

6. A track access control system according to claim 5, wherein said controllable eccentricity detecting means detects optimum controllable eccentricity data falling in a center of said follow range.

7. A track access control system according to claim 6, wherein said controllable eccentricity detecting means comprises:
   deviation detecting means for detecting a deviation of said eccentricity data for at least a half rotation of said disk from said eccentricity data stored in said memory;
   track skip means, operatively connected to said deviation detecting means, for skipping the head via the track actuator means by said detected deviation;
   eccentricity detecting and updating means for detecting adjusted eccentricity data adjusted by said skip operation of the head, and updating said digital eccentricity data in said eccentricity wave signal storage means as the polygonal line shaped sinusoidal eccentricity signal; and
   optimum eccentricity detection control means for detecting said optimum eccentricity for at least a half rotation of said disk and controlling operations of said deviation detecting means, said track skip means and said eccentricity detecting and updating means to sequentially continue operations until said optimum eccentricity is detected.

8. A track access control system according to claim 7, wherein said detection of said eccentricity and/or said detection of said optimum eccentricity data are carried out in one full rotation of said disk.

9. A track access control system according to claim 8, wherein said memory comprises a random access memory into which said eccentricity and/or said optimum eccentricity data are stored during only said first condition and from which said eccentricity and/or optimum eccentricity data are read during only said second condition, and wherein said address generation circuit comprises counter means for receiving a rotation signal and generating an address for said memory in response to said rotation signal.

10. A track access control system according to claim 9, wherein said rotation signal is a clock signal generated by a clock generator, and said clock signal driving said rotatable recording disk.

11. A track access control system according to claim 9, wherein said filter comprises:
   a resistor connected to said memory; and
   a capacitor connected to said resistor and said comparator, said resistor and said capacitor forming a first-order delay circuit.

12. A track access control system according to claim 1, wherein the track actuator means comprises a first moving unit, and a second moving unit mounted on said first moving unit, said first moving unit moving the head more than one track, and said second moving unit finely moving the head at the track after completion of the movement by said first moving unit.

13. A track access control system for use in a disk storage system including: a rotatable recording disk having a plurality of tracks, on which data is recorded and from which data is read, formed along a rotation direction of the rotatable disk; a data recording and reading head which is movable in a radial direction across the disk; track actuator means for moving the head in a radial direction of the disk; and a track error sensor for detecting a track error signal in response to a signal read through the head, said control system comprising:
   track servo control means, operatively connected to the track error sensor and the track actuator means, for positioning the head at a desired position through the track actuator means in response to the track error signal from the track error sensor; and
   eccentricity correction means, operatively connected to the track error sensor, and operatively connected to the track error sensor, and operatively connected to said track servo control means to cooperate therewith, for detecting an eccentricity of said tracks at a first condition, storing said eccentricity, and compensating said eccentricity of said track together with said track servo control means at a second condition after said first condition, said eccentricity correction means comprising:
   eccentricity detecting means for detecting said eccentricity and producing eccentricity data in response to a deviation of said track for at least half rotation of said disk;
   eccentricity wave signal storage means for storing digital eccentricity data and comprising:
      a memory;
      an address generation circuit connected to said memory;
      a filter connected to an output of said memory; and
      a comparator having a first input connected to an output of said filter, a second input connected to said eccentricity detecting means to receive said eccentricity data, and an output connected to an input of said memory;
   said address generation circuit generating an address for said memory in response to a rotation of said disk, said filter producing an analog reproduction eccentricity wave signal in response to data stored in said memory, said comparator comparing said analog reproduction eccentricity wave signal with said received eccentricity and outputting the digital eccentricity data comprising a polygonal line shaped sinusoidal eccentricity signal;
   eccentricity compensation means for receiving said analog reproduction eccentricity wave signal from said filter and adding said received reproduction eccentricity wave signal to the track error signal; and

UNITED STATES PATENT AND TRADEMARK OFFICE
CERTIFICATE OF CORRECTION

PATENT NO. : 4,985,882
DATED : January 15, 1991
INVENTOR(S) : Shigeyoshi Tanaka, et. al.

It is certified that error appears in the above-identified patent and that said Letters Patent is hereby corrected as shown below:

Column 2, line 4, "unit," should be --unit--.

Column 9, line 61, "of" should be --from--,"from" should be --of--.

Column 11, line 29, "a" should be --$\ell$--; "given" should be --provided--; line 30, "a" should be --$\ell$--.

Column 21, line 62, after "head" should be --more than one track and said second moving unit finely moving the head--.

Signed and Sealed this

Twenty-ninth Day of December, 1992

*Attest:*

DOUGLAS B. COMER

*Attesting Officer*   Acting Commissioner of Patents and Trademarks